(12) United States Patent
Kim et al.

(10) Patent No.: US 10,122,921 B2
(45) Date of Patent: Nov. 6, 2018

(54) APPARATUS AND METHOD FOR AUTOMATICALLY RECOGNIZING OBJECT BY USING LOW-SPEED CAMERA IN DUAL PHOTOGRAPHING MODE

(71) Applicant: Electronics and Telecommunications Research Institute, Daejeon-si (KR)

(72) Inventors: Jong Sung Kim, Daejeon-si (KR); Myung Gyu Kim, Daejeon-si (KR); Woo Suk Kim, Daejeon-si (KR); Sang Woo Seo, Daejeon-si (KR); Il Kwon Jeong, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 121 days.

(21) Appl. No.: 15/240,087

(22) Filed: Aug. 18, 2016

(65) Prior Publication Data
US 2017/0257568 A1    Sep. 7, 2017

(30) Foreign Application Priority Data

Mar. 4, 2016    (KR) .................. 10-2016-0026422

(51) Int. Cl.
*H04N 5/247* (2006.01)
*G06K 9/00* (2006.01)
(Continued)

(52) U.S. Cl.
CPC .......... *H04N 5/23245* (2013.01); *G06K 9/00* (2013.01); *G06T 7/2006* (2013.01);
(Continued)

(58) Field of Classification Search
None
See application file for complete search history.

(56) References Cited

U.S. PATENT DOCUMENTS 4,063,259 A * 12/1977 Lynch ................ A63B 24/0021
352/39
6,042,483 A * 3/2000 Katayama .......... A63B 24/0003
473/152
(Continued)

FOREIGN PATENT DOCUMENTS

KR    10-0871595    12/2008
KR    10-1019782    3/2011
(Continued)

OTHER PUBLICATIONS

Jaewook Jung et al., "Measurement of Initial Motion of a Flying Golf Ball with Multi-Exposure Images for Screen-Golf", IEEE Transactions on Consumer Electronics, vol. 56, No. 2, May 2010; pp. 516-523.

*Primary Examiner* — Reza Aghevli
(74) *Attorney, Agent, or Firm* — Kile Park Reed & Houtteman PLLC (57) ABSTRACT

Provided is an apparatus and method for automatically recognizing an object by using a low-speed camera in a dual photographing mode, in which the apparatus includes an image acquirer and an image information analyzer. In the present disclosure, without using a separate motion sensor a movement state of a specific object during sports activities may be automatically recognized by using a successive photographing function of a low-speed camera in a dual photographing mode. Further, once an object starts moving, high-speed images in a multiple exposure mode may be automatically captured by using a high-speed photographing function of the low-speed camera in a dual photographing mode without using an expensive high-speed camera, and based on the captured images, movement information, including a movement speed and direction of the sports ball, the force and axis of rotation of the ball, and the like, is (Continued)

automatically analyzed to generate object movement information.

20 Claims, 7 Drawing Sheets

(51) Int. Cl.
    *H04N 5/20*     (2006.01)
    *G06T 7/20*     (2017.01)
    *H04N 5/232*     (2006.01)
    *H04N 5/235*     (2006.01)
    *H04N 5/225*     (2006.01)

(52) U.S. Cl.
    CPC ......... *G06T 7/2093* (2013.01); *H04N 5/2258* (2013.01); *H04N 5/2351* (2013.01); *H04N 5/2353* (2013.01); *H04N 5/23254* (2013.01); *H04N 5/247* (2013.01); *G06T 2207/10144* (2013.01); *G06T 2207/30224* (2013.01); *G06T 2207/30241* (2013.01)

(56) References Cited

U.S. PATENT DOCUMENTS

| | | | | |
|---|---|---|---|---|
| 2004/0032970 | A1* | 2/2004 | Kiraly | A63B 24/0021 382/103 |
| 2006/0008116 | A1* | 1/2006 | Kiraly | G06T 7/20 382/103 |
| 2007/0202959 | A1* | 8/2007 | Rankin | A63B 24/0003 473/151 |
| 2007/0298897 | A1* | 12/2007 | Kiraly | A63B 24/0003 473/131 |
| 2007/0298898 | A1* | 12/2007 | Kiraly | A63B 24/0021 473/131 |
| 2008/0039222 | A1* | 2/2008 | Kiraly | A63B 24/0003 473/131 |
| 2008/0287207 | A1 | 11/2008 | Manwaring | |
| 2009/0270204 | A1* | 10/2009 | Saegusa | A63B 24/0003 473/409 |
| 2010/0151957 | A1* | 6/2010 | Hohla | A63B 24/0003 473/221 |
| 2010/0210377 | A1* | 8/2010 | Lock | A63B 24/0003 473/409 |
| 2015/0326873 | A1* | 11/2015 | Tan | H04N 21/236 375/240.12 |
| 2016/0027325 | A1* | 1/2016 | Malhotra | G06F 19/3481 434/252 |
| 2016/0306036 | A1* | 10/2016 | Johnson | G01S 13/68 |
| 2016/0350922 | A1* | 12/2016 | Tofolo | G06T 7/20 |

FOREIGN PATENT DOCUMENTS

| | | |
|---|---|---|
| KR | 10-1019798 | 3/2011 |
| KR | 10-1044887 | 6/2011 |
| WO | 2012/002734 | 1/2012 |

\* cited by examiner

APPARATUS AND METHOD FOR AUTOMATICALLY RECOGNIZING OBJECT BY USING LOW-SPEED CAMERA IN DUAL PHOTOGRAPHING MODE

CROSS-REFERENCE TO RELATED APPLICATION(S)

This application claims priority from Korean Patent Application No. 10-2016-0026422, filed on Mar. 4, 2016, in the Korean Intellectual Property Office, the entire disclosure of which is incorporated herein by reference for all purposes.

BACKGROUND

1. Field

The following description relates to an apparatus and method for automatically recognizing an object by using a low-speed camera in a dual photographing mode, and more particularly to an apparatus and method for automatically recognizing an object by using a low-speed camera in a dual photographing mode, in which the camera supports both a successive photographing mode for capturing successive images by a single exposure and a high-speed photographing mode for capturing high-speed images by a multiple exposure. Without using a separate motion recognition sensor, an expensive high-speed camera, or a separate flash lamp device, the apparatus and method may automatically recognize the movement of a sports ball, automatically capture high-speed images of the moving ball, and automatically analyze movement information, including a movement velocity and direction of the sports ball, the force and axis of rotation of the ball, and the like.

2. Description of the Related Art

In the sports field, analysis of movement of an object, such as a ball, is necessary for virtual training of professional players or ordinary people in ball game sports when they swing, kick, or pitch a real golf ball, football, baseball, and the like. Further, the analysis of movement of a ball is also necessary for virtual sports experience based on a movement trajectory simulation of a golf ball, a football, a baseball, and the like, which are swung, kicked, or pitched by users in the virtual ball game sports, including virtual coaching, virtual golf, virtual football, virtual baseball, and the like.

In a general technology, the movement of an object in the sports field is analyzed by using a separate motion sensor, such as a linescan camera, an infrared sensor, and the like to sense a point in time when a ball passes a specific region, by capturing high-speed images of a fast moving ball by using an expensive high-speed camera or a flash lamp device such as a stroboscope, and by analyzing the capture high-speed images using movement analysis technology.

However, the general method requires a separate motion sensor, such as a linescan camera and an infrared sensor, to sense the movement of an object, as well as an expensive high-speed camera and a flash lamp device, such as a stroboscope, to capture the images of a fast moving ball.

In addition, since the motion sensor, such as a general linescan camera and an infrared sensor, may not recognize the shape of an object, the motion sensor senses not only the movement of a sports ball but also the movement of other objects. Further, in the case of using a high-speed camera and a stroboscope, the amount of image data and the amount of calculation are increased, such that images may not be processed in real time if the amount of image data and the amount of calculation are not reduced forcibly by setting a region of interest (ROI) or setting a low resolution.

SUMMARY

Provided is an apparatus and method for automatically recognizing an object by using a low-speed camera in a dual photographing mode, in which two low-speed cameras in a dual photographing mode are used, which support both a successive photographing mode for capturing successive images by a single exposure and a high-speed photographing mode for capturing high-speed images by a multiple exposure. Without using a separate motion sensor such as a linescan camera and an infrared sensor, an expensive high-speed camera, and a separate flash lamp device such as a stroboscope, the apparatus and method may automatically recognize the movement of a specific object, such as a sports ball, in the sports field, automatically capture high-speed images of a moving objet, and automatically analyze movement information, including a movement velocity and direction of the object, the force and axis of rotation of the object, and the like. In this manner, the apparatus and method may enable a high-end virtual training environment and virtual experience for professional players or ordinary people in ball game sports such as golf, football, baseball, and the like.

In one general aspect, there is provided an apparatus for automatically recognizing an object by using a low-speed camera in a dual photographing mode, the apparatus including: an image acquirer configured to acquire successive images in a single exposure mode and high-speed images in a multiple exposure mode by using two low-speed cameras capable of performing successive photographing and high-speed photographing operations; and an image information analyzer configured to generate object movement information by analyzing the acquired successive images to determine a movement state of the object, and by analyzing successive images and high-speed images acquired by controlling photographing operations of the two low-speed cameras based on the determination.

The image acquirer may include: a first camera configured to include a first timer and a first shutter, and controlled to perform successive photographing and high-speed photographing operations; and a second camera configured to include a second timer and a second shutter, and controlled to perform high-speed photographing operations.

The first timer and the second timer may be synchronized with each other, and the first shutter and the second shutter may perform successive photographing and high-speed photographing operations respectively, according to the movement state of the object based on the first timer and the second timer which are synchronized with each other.

In a case where the movement state of the object is a state of waiting for movement, the image acquirer may control the first shutter to operate in a single exposure mode to enable the first camera to perform successive photographing operations, and to stop photographing operations of the second camera; and in a case where the movement state of the object is a state of being ready for movement, the image acquirer may control the first shutter to operate in a multiple exposure mode to enable the first camera to perform high-speed photographing operations, and also controls the second shutter to operate in a multiple exposure mode to enable the second camera to perform high-speed photographing operations.

The image acquirer may acquire high-speed images in a multiple exposure mode by repeatedly operating the first shutter and the second shutter N times at regular time intervals while one image frame is acquired.

The image information analyzer may further include: a successive image analyzer configured to analyze the acquired successive images to search for foreground regions in the successive images, and to determine that the movement state of the object to be a state of waiting for movement or a state of being ready for movement depending on whether there is a foreground region and an object region having a size similar to an expected size of an object among sizes of the searched foreground regions in the successive images; a photographing controller configured to control photographing operations of the two cameras included in the image acquirer according to the determined movement state of the object; a high-speed image analyzer configured to analyze the acquired successive images to search for foreground regions in the high-speed images, and to determine whether the object has started movement by detecting an object region from the searched foreground regions, and by comparing a central point of an object region in a high-speed image of a current frame with a central point of an object region in a high-speed image of a previous frame; and an object movement information generator configured to determine the movement state of the object to be a state of waiting for movement in response to a determination that the object has yet to start movement, and generate object movement information in response to a determination that the object has started movement.

The successive image analyzer may search for the foreground regions of the successive images by generating a background by locally calculating an average value or a mean value of the brightness of the successive images, by removing regions having a lower brightness value than the brightness of the generated background, and by analyzing connectivity of regions remaining in the successive images from which the background is removed.

The high-speed image analyzer may search for the foreground regions of the high-speed images by generating a background by locally calculating an average value or a mean value of the brightness of the high-speed images, by removing regions having a lower brightness value than the brightness of the generated background, and by analyzing connectivity of regions remaining in the high-speed images from which the background is removed.

The successive image analyzer may determine whether there is a foreground region having a size similar to the size of the object, wherein in response to a determination that there is no foreground region having a size similar to the size of the object, the successive image analyzer may determine the movement state of the object to be a state of waiting for movement, and in response to a determination that there is a foreground region having a size similar to the size of the object, the successive image analyzer may compare an expected shape of the object with a shape of the foreground region to determine again whether there is a foreground region having a size similar to the size of an object, wherein in response to a determination that there is no foreground region having a size similar to the size of the object, the successive image analyzer may determine the movement state of the object to be a state of waiting for movement, and in response to a determination that there is a foreground region having a size similar to the size of the object, the successive image analyzer may determine the movement state of the object to be a state of being ready for movement.

The object movement information generator may further include: an object speed information generator configured to generate object speed information, which includes the movement speed and direction of the object, by reconstructing three-dimensional positions of central points in an object region to generate object movement information, and by calculating displacement of the reconstructed 3D positions of central points in the object region; an object rotation information generator configured to generate object rotation information, which includes a force and axis of rotation of the object, by reconstructing a 3D pattern on a surface of the object by using images of regions surrounding the central points of the object region, and by calculating rotation of the reconstructed 3D pattern of the regions surrounding the central points of the object region; and an object movement information generator configured to generate object movement information that includes the object speed information and the object rotation information.

In another general aspect, there is provided a method of automatically recognizing an object by using a low-speed camera in a dual photographing mode, the method including: acquiring successive images in a single exposure mode and high-speed images in a multiple exposure mode by using two low-speed cameras capable of performing successive photographing and high-speed photographing operations; and generating object movement information by analyzing the acquired successive images to determine a movement state of the object, and by analyzing successive images and high-speed images acquired by controlling photographing operations of the two low-speed cameras based on the determination.

The acquiring of the images may include: acquiring successive and high-speed images by using a first camera including a first timer and a first shutter, and controlled to perform successive photographing and high-speed photographing operations, and a second camera including a second timer and a second shutter, and controlled to perform high-speed photographing operations.

The first timer and the second timer may be synchronized with each other, and the first shutter and the second shutter may perform successive photographing and high-speed photographing operations respectively, according to the movement state of the object based on the first timer and the second timer which are synchronized with each other.

The acquiring of the images may include: in a case where the movement state of the object is a state of waiting for movement, controlling the first shutter to operate in a single exposure mode, so as to enable the first camera to perform successive photographing operations and to stop photographing operations of the second camera; and in a case where the movement state of the object is a state of being ready for movement, controlling the first shutter to operate in a multiple exposure mode to enable the first camera to perform high-speed photographing operations, and also controlling the second shutter to operate in a multiple exposure mode to enable the second camera to perform high-speed photographing operations.

The acquiring of the images may include acquiring high-speed images in a multiple exposure mode by repeatedly operating the first shutter and the second shutter N times at regular time intervals while one image frame is acquired.

The generating of the object movement information may further include: analyzing the acquired successive images to search for foreground regions in the successive images, and determining that the movement state of the object to be a state of waiting for movement or a state of being ready for movement depending on whether there is a foreground region and an object region having a size similar to an expected size of an object among sizes of the searched foreground regions in the successive images; controlling photographing operations of the two cameras included in the image acquirer according to the determined movement state of the object; analyzing the acquired successive images to search for foreground regions in the high-speed images, and determining whether the object has started movement by detecting an object region from the searched foreground regions, and by comparing a central point of an object region in a high-speed image of a current frame with a central point of an object region in a high-speed image of a previous frame; and determining the movement state of the object to be a state of waiting for movement in response to a determination that the object has yet to start movement, and generating object movement information in response to a determination that the object has started movement.

The determining that the movement state of the object to be a state of waiting for movement or a state of being ready for movement may include searching for the foreground regions of the successive images by generating a background by locally calculating an average value or a mean value of the brightness of the successive images, by removing regions having a lower brightness value than the brightness of the generated background, and by analyzing connectivity of regions remaining in the successive images from which the background is removed.

The determining whether the object has started movement may include searching for the foreground regions of the high-speed images by generating a background by locally calculating an average value or a mean value of the brightness of the high-speed images, by removing regions having a lower brightness value than the brightness of the generated background, and by analyzing connectivity of regions remaining in the high-speed images from which the background is removed.

The determining whether the object has started movement may include determining whether there is a foreground region having a size similar to the size of the object, wherein in response to a determination that there is no foreground region having a size similar to the size of the object, the movement state of the object may be determined to be a state of waiting for movement, and in response to a determination that there is a foreground region having a size similar to the size of the object, an expected shape of the object may be compared with a shape of the foreground region to determine again whether there is a foreground region having a size similar to the size of an object, wherein in response to a determination that there is no foreground region having a size similar to the size of the object, the movement state of the object may be determined to be a state of waiting for movement, and in response to a determination that there is a foreground region having a size similar to the size of the object, the movement state of the object may be determined to be a state of being ready for movement.

The generating of the object movement information may further include: generating object speed information, which includes the movement speed and direction of the object, by reconstructing three-dimensional positions of central points in an object region to generate object movement information, and by calculating displacement of the reconstructed 3D positions of central points in the object region; generating object rotation information, which includes a force and axis of rotation of the object, by reconstructing a 3D pattern on a surface of the object by using images of regions surrounding the central points of the object region, and by calculating rotation of the reconstructed 3D pattern of the regions surrounding the central points of the object region; and generating object movement information that includes the object speed information and the object rotation information.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Exemplary embodiments of the present disclosure will be described in detail with reference to the accompanying drawings to help those skilled in the art to easily understand and carry out the present disclosure. However, the present disclosure should not be construed as being limited to the embodiments set forth herein, and may be embodied in various different forms.

For clarity of description of the present invention, parts unrelated to the description are omitted, and throughout the drawings and the detailed description, the same drawing reference numerals will be understood to refer to the same elements, features, and structures.

In addition, unless explicitly described to the contrary, the word "comprise" and variations such as "comprises" or "comprising" will be understood to imply the inclusion of stated elements but not the exclusion of any other elements.

Hereinafter, the apparatus and method for automatically recognizing an object by using a low-speed camera in a dual photographing mode will be described in detail with reference to the accompanying drawings.

Figure 1:
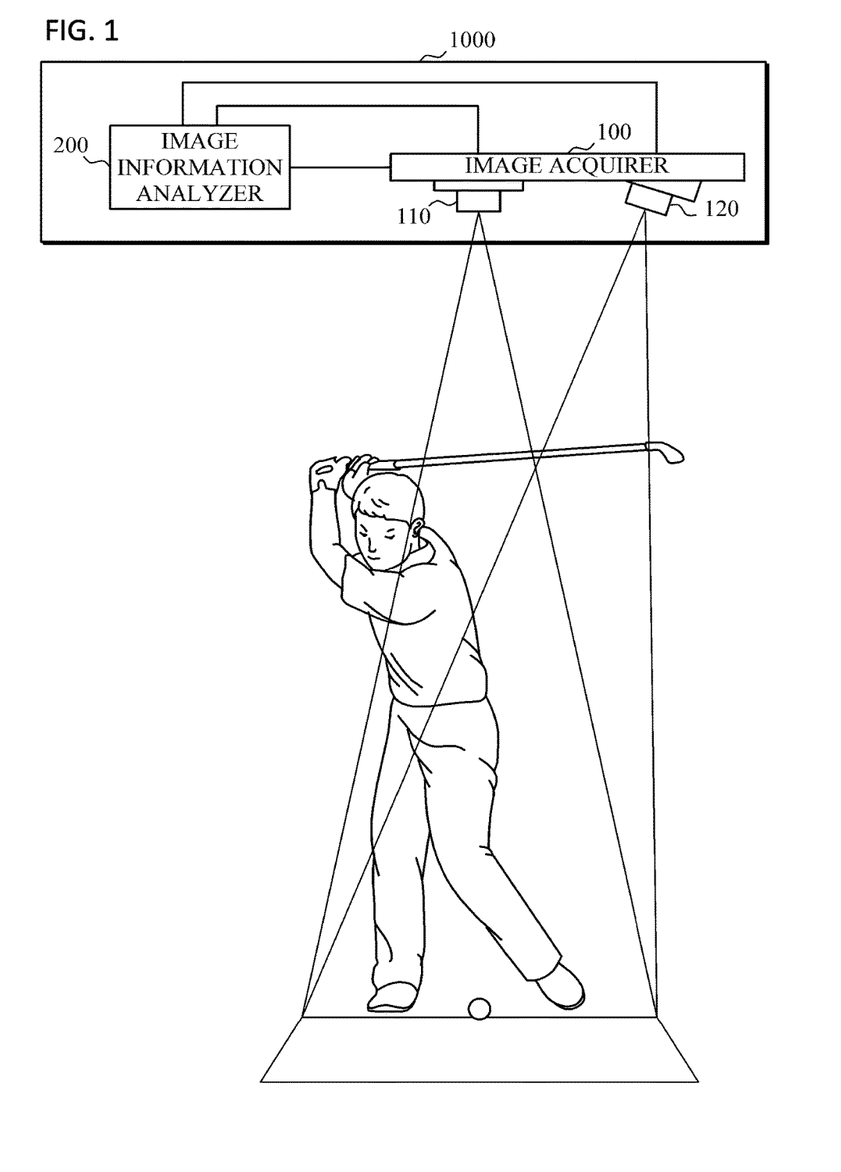
FIG. 1 is a block diagram illustrating an apparatus for automatically recognizing an object by using a low-speed camera in a dual photographing mode according to an exemplary embodiment.

FIG. 1 is a block diagram illustrating an apparatus for automatically recognizing an object by using a low-speed camera in a dual photographing mode according to an exemplary embodiment.

Referring to FIG. 1, the apparatus 1000 for automatically recognizing an object includes an image acquirer 100 and an image information analyzer 200.

The image acquirer 100 acquires successive images in a single exposure mode and high-speed images in a multiple exposure mode by using two low-speed cameras that may perform successive photographing and high-speed photographing operations.

The image acquirer 100 will be described in further detail with reference to FIG. 2.

The image information analyzer 200 analyzes the acquired successive images to determine a movement state of an object, and may generate object movement information by analyzing successive images and high-speed images acquired by controlling the photographing operations of the two low-speed cameras based on the determination.

The image information analyzer 200 will be described in further detail with reference to FIG. 3.

Figure 2:
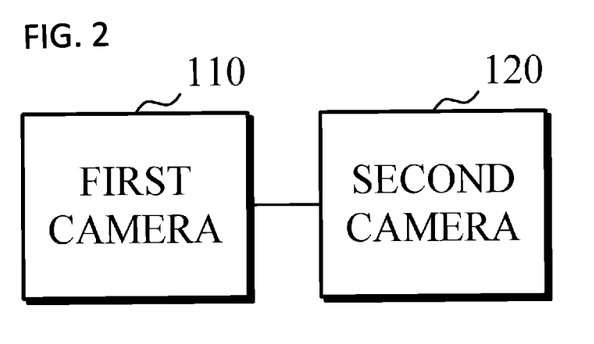
FIG. 2 is a block diagram illustrating in detail an image acquirer illustrated in FIG. 1.

FIG. 2 is a block diagram illustrating in detail the image acquirer 100 illustrated in FIG. 1.

Referring to FIG. 2, the image acquirer 100 includes a first camera 100 and a second camera 120.

The first camera 110 includes a first timer and a first shutter, and may be controlled to perform successive photographing and high-speed photographing operations.

The second camera 120 includes a second timer and a second shutter, and may be controlled to perform high-speed photographing operations.

The first timer and the second timer are synchronized with each other, and the first shutter and the second shutter may perform successive photographing and high-speed photographing operations, respectively according to a movement state of an object based on the first timer and the second timer which are synchronized with each other.

In the case where the object is in a state of waiting for movement, the first shutter included in the first camera of the image acquirer 100 is controlled to operate in a single exposure mode, such that the first camera may perform successive photographing operations to capture successive images of an object. In this case, the second camera may be controlled to stop photographing.

In the case where the object is in a state of being ready for movement, the first shutter included in the first camera of the image acquirer 100 is controlled to operate in a multiple exposure mode, such that the first camera may perform high-speed photographing operations to capture high-speed images of an object. In this case, the second shutter may also be controlled to operate in a multiple exposure mode to enable the first camera to capture high-speed images of an object.

In the case where the object is in a state of being ready for movement, high-speed images in a multiple exposure mode may be captured by using the first camera and the second camera in such a manner that the first shutter and the second shutter operate repeatedly N times at regular time intervals while one image frame is acquired.

Figure 3:
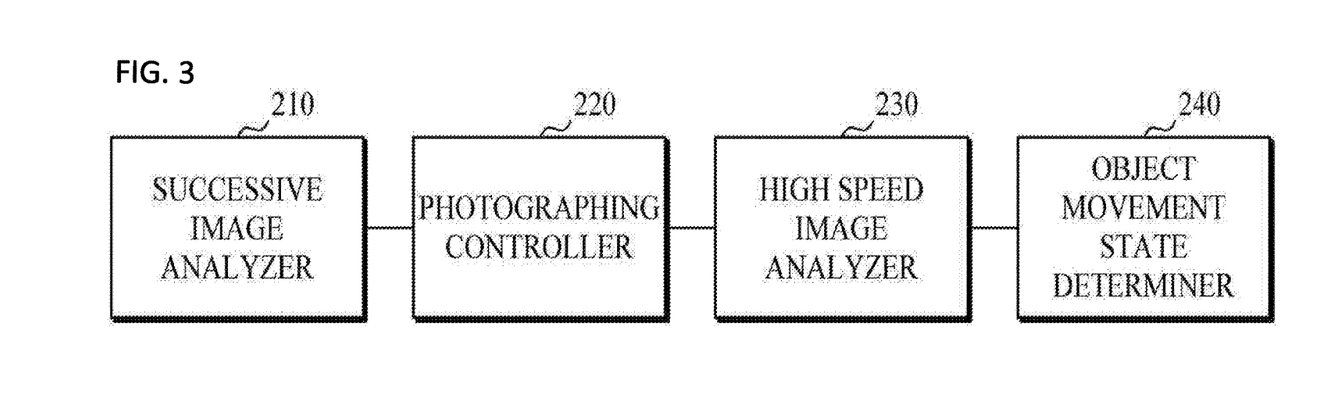
FIG. 3 is a block diagram illustrating in detail an image information analyzer illustrated in FIG. 1.

FIG. 3 is a block diagram illustrating in detail an image information analyzer 200 illustrated in FIG. 1.

Referring to FIG. 3, the image information analyzer 200 includes a successive image analyzer 210, a photographing controller 220, a high-speed image analyzer 230, an object movement state determiner 240.

The successive image analyzer 210 analyzes the acquired successive image, and searches for foreground regions in the successive images. Further, depending on whether there is a foreground region and an object region having a size similar to an expected size of an object among sizes of the searched foreground regions in the successive, the successive image analyzer 210 may determine that a movement state of an object to be a state of waiting for movement or a state of being ready for movement.

In the exemplary embodiment, the foreground region of a successive image may be searched for by generating a background by locally calculating an average value or a mean value of the brightness of successive images, by removing regions having a lower brightness value than the brightness of the generated background, and by analyzing connectivity of regions remaining in the successive image from which the background is removed.

In the exemplary embodiment, it is determined whether there is a foreground region having a size similar to the size of an object. In response to a determination that there is no foreground region having a size similar to the size of an object, a movement state of the object is determined to be a state of waiting for movement.

Further, in response to a determination that there is a foreground region having a size similar to the size of an object, an expected shape of an object is compared with the shape of the foreground region to determine again whether there is a foreground region having a size similar to the size of an object. In response to a determination that there is no foreground region having a size similar to the size of an object, a movement state of the object is determined to be a state of waiting for movement, and in response to a determination that there is a foreground region having a size similar to the size of an object, a movement state of the object is determined to be a state of being ready for movement.

Based on the determined movement state of the object, the photographing controller 220 may control photographing operations of two cameras included in the image acquirer.

In the case where a movement state of an object is a state of waiting for movement, the photographing controller 220 controls the first shutter included in the first camera of the image acquirer 100 to operate in a single exposure mode, so as to enable the first camera to capture successive images of the object. In this case, the photographing controller 220 may control the second camera to stop photographing.

Further, in the case where a movement state of the object is a state of being ready for movement, the photographing controller 220 controls the first shutter included in the first camera of the image acquirer 100 to operate in a multiple exposure mode, so as to enable the first camera to capture high-speed images of the object. In this case, the photographing controller 220 may also control the second shutter included in the second camera to capture high-speed images of the object.

The high-speed image analyzer 230 may analyze the acquired successive images to search for foreground regions in the successive images, and may determine whether an object has started movement by detecting an object region from the searched foreground regions, and by comparing a central point of an object region in a high-speed image of a current frame with a central point of an object region in a high-speed image of a previous frame.

In the exemplary embodiment, the foreground region of a successive image may be searched for by generating a background by locally calculating an average value or a mean value of the brightness of successive images, by removing regions having a lower brightness value than the brightness of the generated background, and by analyzing connectivity of regions remaining in the successive image from which the background is removed.

The high-speed image analyzer 230 will be described in further detail with reference to FIG. 4.

In response to a determination that an object has yet to start movement, the object movement state determiner 240 determines that the movement state of the object to be a state of waiting for movement, while in response to a determination that an object has started movement, the object movement state determiner 240 generates movement information of the object.

In the exemplary embodiment, the object movement information may include object speed information and object rotation information.

Figure 4:
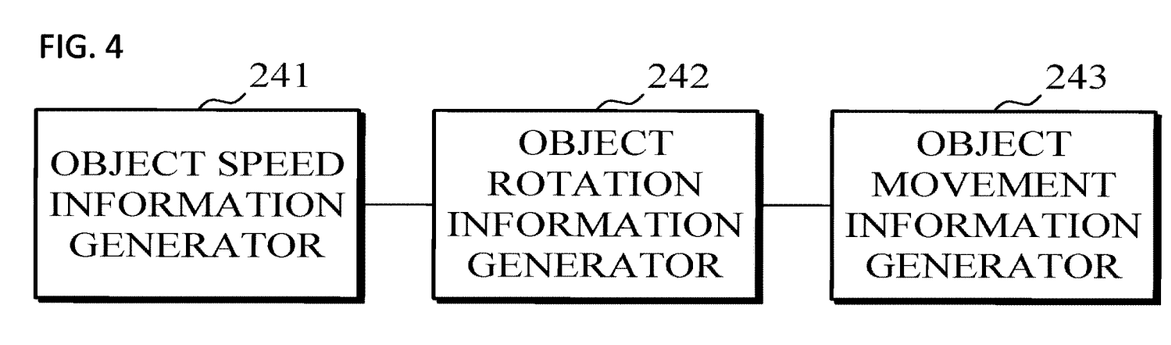
FIG. 4 is a block diagram illustrating an object movement state determiner illustrated in FIG. 3.

FIG. 4 is a block diagram illustrating an object movement state determiner 240 illustrated in FIG. 3.

Referring to FIG. 4, the object movement state determiner 240 includes an object speed information generator 241, an object rotation information generator 242, and an object movement information generator 243. The object speed information generator 241 may generate object speed information, which includes the movement speed and direction of an object, by reconstructing three-dimensional positions of central points in an object region to generate object movement information, and by calculating displacement of the reconstructed 3D positions of central points in the object region.

The object rotation information generator 242 may generate object rotation information, which includes the force and axis of rotation of an object, by reconstructing a 3D pattern on the surface of an object by using images of regions surrounding the central points of the object region, and by calculating rotation of the reconstructed 3D pattern of the regions surrounding the central points of the object region.

The object movement information generator 243 may generate object movement information that includes speed information and rotation information of an object.

Figure 5:
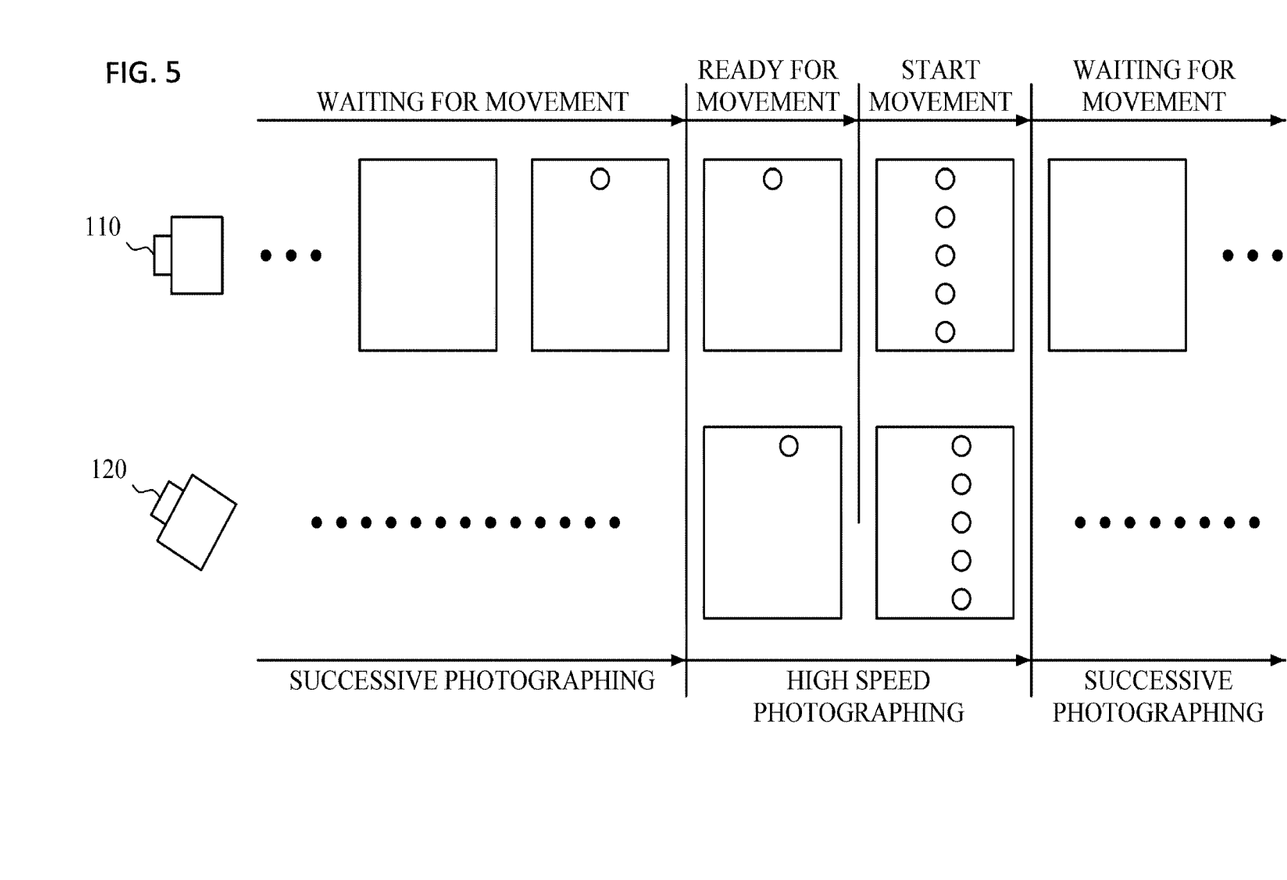
FIG. 5 is a diagram illustrating an image acquirer acquiring successive images and high-speed images according to an exemplary embodiment.

FIG. 5 is a diagram illustrating an image acquirer acquiring successive images and high-speed images according to an exemplary embodiment.

In the exemplary embodiment, a first camera may capture successive images and high-speed images, and a second camera may only capture high-speed images.

The first camera captures successive images required to recognize a movement state of an object, such as a ball, while the object is in a state of waiting for movement or in a state of being ready for movement.

Further, while the object is in a state of being ready for movement and the object has started movement thereafter, the first camera and the second camera capture high-speed images required to recognize a movement state of the object such as a ball, and to generate object movement information, including the movement speed and direction of a ball, the force and axis of rotation of the ball, and the like.

In the exemplary embodiment, by repeatedly operating a shutter included in a general low-speed camera at regular intervals, the first camera and the second camera may perform high-speed photographing operations in a multiple exposure mode, which have the same high-speed photographing effect as a high-speed camera. In this manner, high-speed photographing operations required for the analysis of an object movement may be performed even by using a general low-speed camera that supports a successive photographing mode.

In the case where an object is in a state of waiting for movement, i.e., a state of movement before the object is at the starting point, the first camera performs successive photographing operations to capture successive images of the object, and the second camera may be controlled not to perform successive photographing operations.

Further, in the case where an object is in a state of being ready for movement, i.e., a state of movement immediately before the object starts movement at the starting point, and in the case where an object is in a state of movement after the object has started movement, both the first camera and the second camera may be controlled to perform high-speed photographing operations in a multiple exposure mode.

Figure 6:
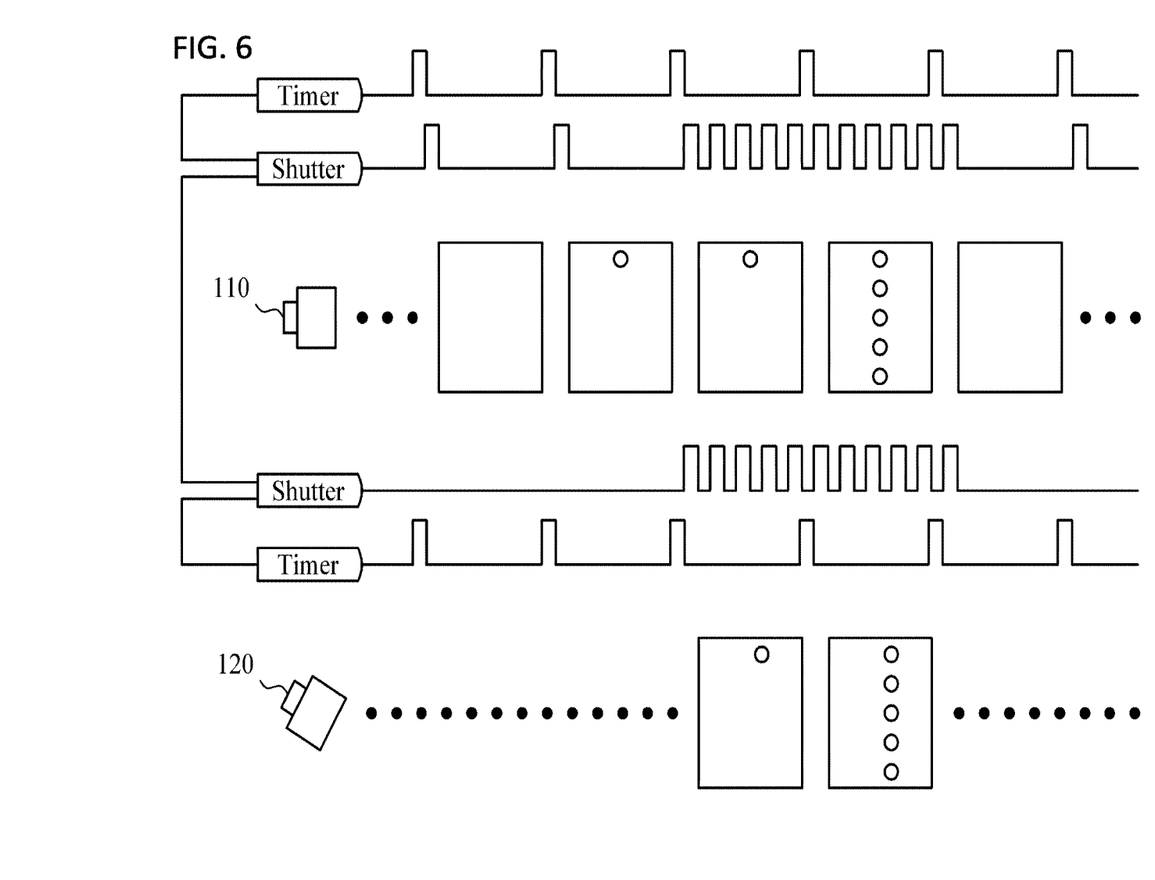
FIG. 6 is a diagram illustrating an example of controlling a first camera and a second camera included in an image acquirer according to an exemplary embodiment.

FIG. 6 is a diagram illustrating an example of controlling a first camera and a second camera included in an image acquirer according to an exemplary embodiment.

In the exemplary embodiment, the first camera and the second camera may operate based on a first timer and a second timer respectively.

In the case where a movement state of an object is a state of waiting for movement, the first shutter is controlled to operate in a single exposure mode based on the first timer and the second timer which are synchronized with each other, so that the first camera may capture successive images of an object, while the second camera is controlled to stop photographing.

Further, in the case where a movement state of an object is a state of being ready for movement, the first shutter is controlled to operate in a multiple exposure mode, so that the first camera may capture high-speed images of an object. In this case, the second shutter is also controlled to operate in a multiple exposure mode, so that the second camera may capture high-speed images of an object.

Here, the first shutter and the second shutter may receive movement state information of an object from the photographing controller 220 included in the image information analyzer 200.

In the exemplary embodiment, in the case where a movement state of an object is a state of waiting for movement, the first shutter is controlled to operate in a single exposure mode so that the first camera may perform successive photographing operations, and the second shutter may control the second camera to stop photographing.

Further, in the case where a movement state of an object is a state of waiting for movement, the first shutter is controlled to operate in a multiple exposure mode so that the first camera may perform high-speed photographing operations. In this case, the second shutter is also controlled to operate in a multiple exposure mode so that the second camera may perform high-speed photographing operations.

High-speed images in a multiple exposure mode may be captured by using the first camera and the second camera in such a manner that the first shutter and the second shutter operate repeatedly N times at regular time intervals while one image frame is acquired.

Figure 7:
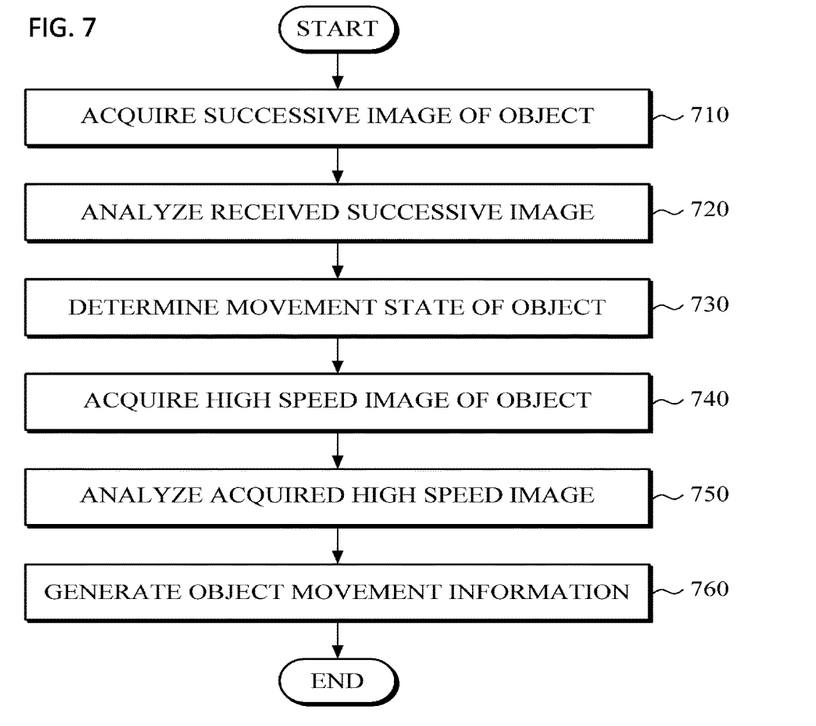
FIG. 7 is a flowchart illustrating a method of automatically recognizing an object by using a low-speed camera in a dual photographing mode according to an exemplary embodiment.

FIG. 7 is a flowchart illustrating a method of automatically recognizing an object by using a low-speed camera in a dual photographing mode according to an exemplary embodiment.

Successive images of an object are captured by the first camera in 710.

In the exemplary embodiment, the first camera includes a first timer and a first shutter, and may be controlled to perform successive photographing and high-speed photographing operations.

The captured successive images are analyzed in 720.

In the exemplary embodiment, the captured successive images are analyzed to search for foreground regions in the successive images.

In the exemplary embodiment, the foreground region of a successive image may be searched for by generating a background by locally calculating an average value or a mean value of the brightness of successive images, by removing regions having a lower brightness value than the brightness of the generated background, and by analyzing connectivity of regions remaining in the successive image from which the background is removed.

A movement state of an object is determined in 730.

Depending on whether there is a foreground region and an object region having a size similar to an expected size of an object among sizes of the searched foreground regions in the successive images, a movement state of an object may be determined to be a state of waiting for movement or a state of being ready for movement.

In the exemplary embodiment, it is determined whether there is a foreground region having a size similar to the size of an object. In response to a determination that there is no foreground region having a size similar to the size of an object, a movement state of the object is determined to be a state of waiting for movement, and the first camera is controlled to capture successive images.

Further, in response to a determination that there is a foreground region having a size similar to the size of an object, an expected shape of an object is compared with the shape of the foreground region to determine again whether there is a foreground region having a size similar to the size of an object. In response to a determination that there is no foreground region having a size similar to the size of an object, a movement state of the object is determined to be a state of waiting for movement, and the first camera is controlled to capture successive images of an object. In response to a determination that there is a foreground region having a size similar to the size of an object, a movement state of the object is determined to be a state of being ready for movement, and the first camera and the second camera are controlled to capture high-speed images of an object.

High-speed images of an object are captured in 740.

In the exemplary embodiment, high-speed images of an object may be captured by the first camera and the second camera.

The first timer and the second time are synchronized with each other, and the first shutter and the second shutter may perform high-speed photographing operations based on the first timer and the second timer which are synchronized with each other.

In the exemplary embodiment, the first shutter is controlled to operate in a multiple exposure mode so that the first camera may capture high-speed images of an object, and the second shutter is also controlled to operate in a multiple exposure mode so that the second camera may capture high-speed images of an object.

In the exemplary embodiment, high-speed images in a multiple exposure mode may be captured by using the first camera and the second camera in such a manner that the first shutter and the second shutter operate repeatedly N times at regular time intervals while one image frame is acquired.

The captured high-speed images are analyzed in 750.

In the exemplary embodiment, the captured successive images are analyzed to search for foreground regions in the successive images.

Depending on whether there is a foreground region and an object region having a size similar to an expected size of an object among sizes of the searched foreground regions in the successive images, a movement state of an object may be determined to be a state of waiting for movement or a state of being ready for movement.

In the exemplary embodiment, it is determined whether there is a foreground region having a size similar to the size of an object. In response to a determination that there is no foreground region having a size similar to the size of an object, a movement state of the object is determined to be a state of waiting for movement.

Further, in response to a determination that there is a foreground region having a size similar to the size of an object, an expected shape of an object is compared with the shape of the foreground region to determine again whether there is a foreground region having a size similar to the size of an object. In response to a determination that there is no foreground region having a size similar to the size of an object, a movement state of the object is determined to be a state of waiting for movement, and in response to a determination that there is a foreground region having a size similar to the size of an object, a movement state of the object is determined to be a state of being ready for movement.

Object movement information is generated in 760.

In the exemplary embodiment, in response to a determination that an object has yet to start movement, a movement state of the object is determined to be a state of waiting for movement, while in response to a determination that an object has started movement, object movement information is generated.

In the exemplary embodiment, three-dimensional positions of central points in an object region may be reconstructed to generate object movement information.

In the exemplary embodiment, object speed information, which includes the movement speed and direction of an object, may be generated by calculating displacement of the reconstructed 3D positions of central points in the object region.

Further, object rotation information, which includes the force and axis of rotation of an object, may be generated by reconstructing a 3D pattern on the surface of an object by using images of regions surrounding the central points of the object region, and by calculating rotation of the reconstructed 3D pattern of the regions surrounding the central points of the object region.

Object movement information, which includes object speed information and object rotation information, may be generated by using the generated object speed information and object rotation information.

In the present disclosure, without using a separate motion sensor, such as a linescan camera and an infrared sensor, a movement state of a specific object during sports activities may be automatically recognized by using a successive photographing function of a low-speed camera in a dual photographing mode. Further, once an object starts moving, high-speed images in a multiple exposure mode may be automatically captured by using a high-speed photographing function of the low-speed camera in a dual photographing mode without using an expensive high-speed camera, and based on the captured images, movement information, including a movement speed and direction of the sports ball, the force and axis of rotation of the ball, and the like, is automatically analyzed, thereby enabling virtual training, virtual coaching, and virtual experience in the sports field.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for automatically recognizing an object by using a low-speed camera in a dual photographing mode, the apparatus comprising:
   an image acquirer configured to acquire successive images in a single exposure mode and high-speed images in a multiple exposure mode by using two low-speed cameras capable of performing successive photographing and high-speed photographing operations; and an image information analyzer configured to generate object movement information by analyzing the acquired successive images to determine a movement state of the object, and by analyzing successive images and high-speed images acquired by controlling photographing operations of the two low-speed cameras based on the determination, wherein the image information analyzer further comprises:

an object movement information generator configured to determine the movement state of the object to be a state of waiting for movement in response to a determination that the object has yet to start movement, and generate object movement information in response to a determination that the object has started movement.

2. The apparatus of claim 1, wherein the image acquirer comprises:

a first camera configured to include a first timer and a first shutter, and controlled to perform successive photographing and high-speed photographing operations; and a second camera configured to include a second timer and a second shutter, and controlled to perform high-speed photographing operations.

3. The apparatus of claim 2, wherein the first timer and the second timer are synchronized with each other, and the first shutter and the second shutter perform successive photographing and high-speed photographing operations respectively, according to the movement state of the object based on the first timer and the second timer which are synchronized with each other.

4. The apparatus of claim 3, wherein:

in a case where the movement state of the object is a state of waiting for movement, the image acquirer controls the first shutter to operate in a single exposure mode to enable the first camera to perform successive photographing operations, and to stop photographing operations of the second camera; and in a case where the movement state of the object is a state of being ready for movement, the image acquirer controls the first shutter to operate in a multiple exposure mode to enable the first camera to perform high-speed photographing operations, and also controls the second shutter to operate in a multiple exposure mode to enable the second camera to perform high-speed photographing operations.

5. The apparatus of claim 3, wherein the image acquirer acquires high-speed images in a multiple exposure mode by repeatedly operating the first shutter and the second shutter N times at regular time intervals while one image frame is acquired.

6. The apparatus of claim 1, wherein the image information analyzer further comprises:

a successive image analyzer configured to analyze the acquired successive images to search for foreground regions in the successive images, and to determine that the movement state of the object to be a state of waiting for movement or a state of being ready for movement depending on whether there is a foreground region and an object region having a size similar to an expected size of an object among sizes of the searched foreground regions in the successive images;

a photographing controller configured to control photographing operations of the two cameras included in the image acquirer according to the determined movement state of the object; and a high-speed image analyzer configured to analyze the acquired successive images to search for foreground regions in the high-speed images, and to determine whether the object has started movement by detecting an object region from the searched foreground regions, and by comparing a central point of an object region in a high-speed image of a current frame with a central point of an object region in a high-speed image of a previous frame.

7. The apparatus of claim 6, wherein the successive image analyzer searches for the foreground regions of the successive images by generating a background by locally calculating an average value or a mean value of the brightness of the successive images, by removing regions having a lower brightness value than the brightness of the generated background, and by analyzing connectivity of regions remaining in the successive images from which the background is removed.

8. The apparatus of claim 6, wherein the high-speed image analyzer searches for the foreground regions of the high-speed images by generating a background by locally calculating an average value or a mean value of the brightness of the high-speed images, by removing regions having a lower brightness value than the brightness of the generated background, and by analyzing connectivity of regions remaining in the high-speed images from which the background is removed.

9. The apparatus of claim 6, wherein the successive image analyzer determines whether there is a foreground region having a size similar to the size of the object, wherein in response to a determination that there is no foreground region having a size similar to the size of the object, the successive image analyzer determines the movement state of the object to be a state of waiting for movement, and in response to a determination that there is a foreground region having a size similar to the size of the object, the successive image analyzer compares an expected shape of the object with a shape of the foreground region to determine again whether there is a foreground region having a size similar to the size of an object, wherein in response to a determination that there is no foreground region having a size similar to the size of the object, the successive image analyzer determines the movement state of the object to be a state of waiting for movement, and in response to a determination that there is a foreground region having a size similar to the size of the object, the successive image analyzer determines the movement state of the object to be a state of being ready for movement.

10. The apparatus of claim 6, wherein the object movement information generator further comprises:

an object speed information generator configured to generate object speed information, which includes the movement speed and direction of the object, by reconstructing three-dimensional positions of central points in an object region to generate object movement information, and by calculating displacement of the reconstructed 3D positions of central points in the object region;

an object rotation information generator configured to generate object rotation information, which includes a force and axis of rotation of the object, by reconstructing a 3D pattern on a surface of the object by using images of regions surrounding the central points of the object region, and by calculating rotation of the reconstructed 3D pattern of the regions surrounding the central points of the object region; and an object movement information generator configured to generate object movement information that includes the object speed information and the object rotation information.

11. A method of automatically recognizing an object by using a low-speed camera in a dual photographing mode, the method comprising:

acquiring successive images in a single exposure mode and high-speed images in a multiple exposure mode by using two low-speed cameras capable of performing successive photographing and high-speed photographing operations; and generating object movement information by analyzing the acquired successive images to determine a movement state of the object, and by analyzing successive images and high-speed images acquired by controlling photographing operations of the two low-speed cameras based on the determination, wherein the generating of the object movement information further comprises:

determining the movement state of the object to be a state of waiting for movement in response to a determination that the object has yet to start movement, and generating object movement information in response to a determination that the object has started movement.

12. The method of claim 11, wherein the acquiring of the images comprises:

acquiring successive and high-speed images by using a first camera including a first timer and a first shutter, and controlled to perform successive photographing and high-speed photographing operations, and a second camera including a second timer and a second shutter, and controlled to perform high-speed photographing operations.

13. The method of claim 12, wherein the first timer and the second timer are synchronized with each other, and the first shutter and the second shutter perform successive photographing and high-speed photographing operations respectively, according to the movement state of the object based on the first timer and the second timer which are synchronized with each other.

14. The method of claim 13, wherein the acquiring of the images comprises:

in a case where the movement state of the object is a state of waiting for movement, controlling the first shutter to operate in a single exposure mode, so as to enable the first camera to perform successive photographing operations and to stop photographing operations of the second camera; and in a case where the movement state of the object is a state of being ready for movement, controlling the first shutter to operate in a multiple exposure mode to enable the first camera to perform high-speed photographing operations, and also controlling the second shutter to operate in a multiple exposure mode to enable the second camera to perform high-speed photographing operations.

15. The method of claim 13, wherein the acquiring of the images comprises acquiring high-speed images in a multiple exposure mode by repeatedly operating the first shutter and the second shutter N times at regular time intervals while one image frame is acquired.

16. The method of claim 11, wherein the generating of the object movement information further comprises:

analyzing the acquired successive images to search for foreground regions in the successive images, and determining that the movement state of the object to be a state of waiting for movement or a state of being ready for movement depending on whether there is a foreground region and an object region having a size similar to an expected size of an object among sizes of the searched foreground regions in the successive images;

controlling photographing operations of the two cameras included in the image acquirer according to the determined movement state of the object; and analyzing the acquired successive images to search for foreground regions in the high-speed images, and determining whether the object has started movement by detecting an object region from the searched foreground regions, and by comparing a central point of an object region in a high-speed image of a current frame with a central point of an object region in a high-speed image of a previous frame.

17. The method of claim 16, wherein the determining that the movement state of the object to be a state of waiting for movement or a state of being ready for movement comprises searching for the foreground regions of the successive images by generating a background by locally calculating an average value or a mean value of the brightness of the successive images, by removing regions having a lower brightness value than the brightness of the generated background, and by analyzing connectivity of regions remaining in the successive images from which the background is removed.

18. The method of claim 16, wherein the determining whether the object has started movement comprises searching for the foreground regions of the high-speed images by generating a background by locally calculating an average value or a mean value of the brightness of the high-speed images, by removing regions having a lower brightness value than the brightness of the generated background, and by analyzing connectivity of regions remaining in the high-speed images from which the background is removed.

19. The method of claim 16, wherein the determining whether the object has started movement comprises determining whether there is a foreground region having a size similar to the size of the object, wherein in response to a determination that there is no foreground region having a size similar to the size of the object, the movement state of the object is determined to be a state of waiting for movement, and in response to a determination that there is a foreground region having a size similar to the size of the object, an expected shape of the object is compared with a shape of the foreground region to determine again whether there is a foreground region having a size similar to the size of an object, wherein in response to a determination that there is no foreground region having a size similar to the size of the object, the movement state of the object is determined to be a state of waiting for movement, and in response to a determination that there is a foreground region having a size similar to the size of the object, the movement state of the object is determined to be a state of being ready for movement.

20. The method of claim 16, wherein the generating of the object movement information further comprises:

generating object speed information, which includes the movement speed and direction of the object, by reconstructing three-dimensional positions of central points in an object region to generate object movement information, and by calculating displacement of the reconstructed 3D positions of central points in the object region;

generating object rotation information, which includes a force and axis of rotation of the object, by reconstructing a 3D pattern on a surface of the object by using images of regions surrounding the central points of the object region, and by calculating rotation of the reconstructed 3D pattern of the regions surrounding the central points of the object region; and generating object movement information that includes the object speed information and the object rotation information.

* * * * *